(12) United States Patent
Järvi

(10) Patent No.: US 6,622,486 B2
(45) Date of Patent: Sep. 23, 2003

(54) ARRANGEMENT FOR AND METHOD OF FEEDING AIR IN A PISTON ENGINE

(75) Inventor: Arto Järvi, Vaasa (FI)

(73) Assignee: Wartsila Technology Oy AB, Helsinki (FI)

( * ) Notice: Subject to any disclaimer, the term of this patent is extended or adjusted under 35 U.S.C. 154(b) by 0 days.

(21) Appl. No.: 10/013,738

(22) Filed: Nov. 7, 2001

(65) Prior Publication Data

US 2002/0088227 A1 Jul. 11, 2002

(30) Foreign Application Priority Data

Nov. 8, 2000 (FI) .............................................. 20002444

(51) Int. Cl.$^7$ ............................. F02B 33/44; F02B 33/00
(52) U.S. Cl. ........................ 60/605.1; 60/606; 123/564; 123/184.57
(58) Field of Search ............................... 60/605.1, 606; 123/184.57, 184.53, 564; 180/68.3

(56) References Cited

U.S. PATENT DOCUMENTS

| | | | | |
|---|---|---|---|---|
| 4,064,696 A | * | 12/1977 | Cser | 123/184.57 |
| 4,353,211 A | * | 10/1982 | Cser et al. | 60/605.1 |
| 4,513,699 A | * | 4/1985 | Cser | 123/184.57 |
| 4,539,947 A | | 9/1985 | Sawada et al. | |
| 4,559,784 A | * | 12/1985 | Jenny et al. | 60/606 |
| 4,625,686 A | * | 12/1986 | Kubis | 123/184.57 |
| 4,805,733 A | | 2/1989 | Kato et al. | |
| 4,858,569 A | * | 8/1989 | Cser et al. | 123/184.57 |
| 4,938,177 A | * | 7/1990 | Hasegawa | 123/184.57 |
| 5,478,098 A | * | 12/1995 | Akagi et al. | 180/68.3 |

FOREIGN PATENT DOCUMENTS

| | | | | |
|---|---|---|---|---|
| DE | 28 31 889 A1 | * | 2/1980 | F02B/27/00 |
| DE | 4439704 | | 5/1996 | |
| DE | 19818873 | | 11/1999 | |
| EP | 1 120 555 | | 8/2001 | F02B/33/44 |
| JP | 57051910 A | * | 3/1982 | F02B/27/00 |
| JP | 01237318 A | * | 9/1989 | F02B/27/02 |
| JP | 04303124 A | * | 10/1992 | F02B/33/44 |
| JP | 2000045782 | | 2/2000 | F02B/33/44 |
| SU | 748023 B | * | 7/1980 | F02B/27/00 |
| SU | 1726809 A2 | * | 4/1992 | F02B/27/00 |
| WO | WO 82/01742 | * | 5/1982 | F02B/27/00 |
| WO | 94/19596 | | 9/1994 | |

* cited by examiner

Primary Examiner—Thomas Denion
Assistant Examiner—Thai-Ba Trieu
(74) Attorney, Agent, or Firm—John Smith-Hill; Smith-Hill and Bedell

(57) ABSTRACT

An arrangement for feeding air in a supercharged piston engine includes at least a supercharging device arranged for feeding air to more than one cylinder, an air chamber in connection with the supercharging device, and a channel arrangement leading from the air chamber to each cylinder of the piston engine. A resonator system is in connection with the air chamber for attenuating the pressure pulsation in the air chamber. In a method of operating the supercharged piston engine, combustion air is fed by means of the supercharging device at a pressure higher than ambient pressure into the air chamber, air is led from the air chamber to the cylinders through the channel arrangements, and a pressure pulsation is formed in the air chamber, which pulsation is half-wavelength shifted from the pulsation in the air chamber, appearing at frequencies at or below the third harmonic of the rotational speed of the engine.

29 Claims, 2 Drawing Sheets

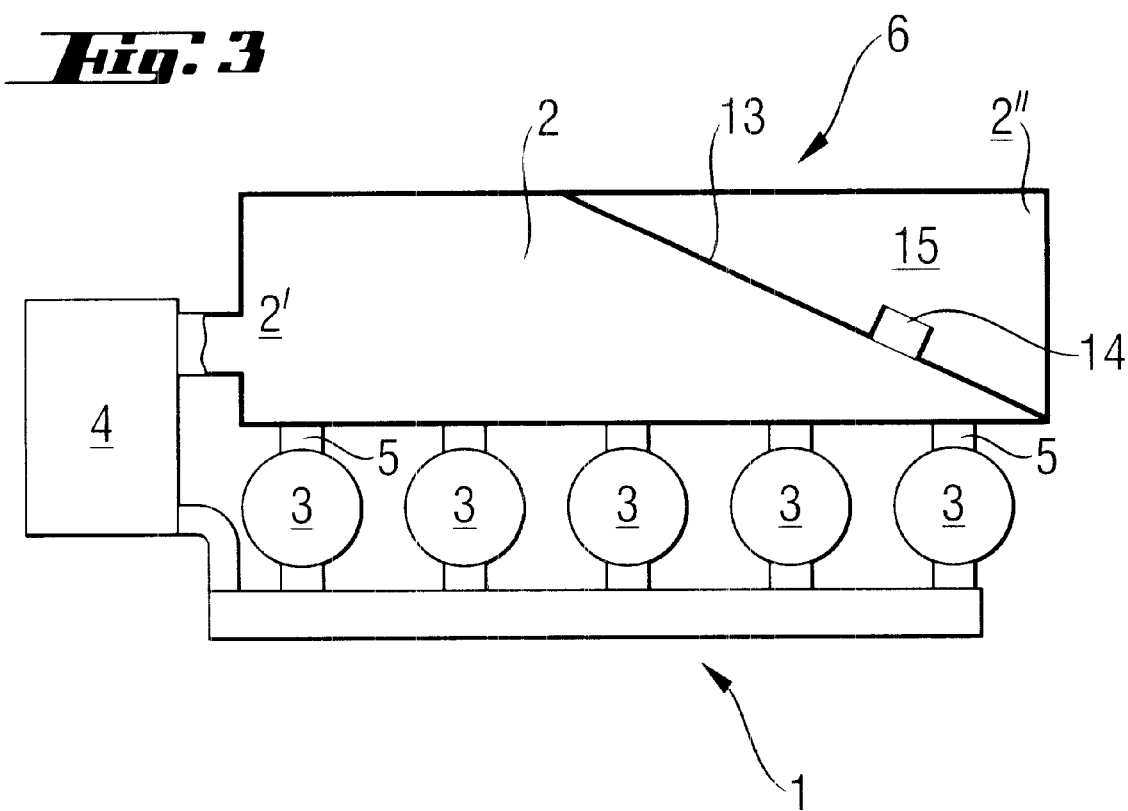

ARRANGEMENT FOR AND METHOD OF FEEDING AIR IN A PISTON ENGINE

BACKGROUND OF THE INVENTION

The invention relates to an arrangement for feeding air in a supercharged piston engine, which air feeding arrangement comprises at least a supercharging device arranged for feeding air to more than one cylinder, an air chamber in connection with the supercharging device, and a channel arrangement leading from the air chamber to each cylinder of the piston engine.

The invention also relates to a method of operating a supercharged piston engine, in which method combustion air is fed by means of a supercharging device at a pressure higher than ambient pressure into an air chamber in connection with the supercharging device, and air is led from the air chamber to cylinders in connection with the air chamber through channel arrangements between the cylinders and the air chamber.

It is known that pressure vibrations take place in intake channels or passages of piston engines and various solutions for damping intake noise have been disclosed. In publication DE 19641715 there is shown a resonator connected in parallel with an inlet air channel. The resonator is provided with a connection tube having variable length and diameter. In this kind of solution a starting point is to attenuate noise emitted from the intake channel to the environment. However, this fails to handle possible pressure pulsations in the engine itself. On the other hand, various resonator arrangements in connection with naturally aspirated engines for enhancing gas admission into the cylinder or combustion chamber have been suggested, e.g. U.S. Pat. No. 5,572,966. In contrast to naturally aspirated engines, in supercharged engines it is possible to select the boost pressure. Thus, a desired amount of gas mixture on average may be fed into the cylinders, but unevenness of charge of the cylinders still remains as a problem due to pressure pulsations.

Additionally, in supercharged multi-cylinder piston engines some problematic operating disturbances, e.g. the so-called pumping phenomenon, have been noticed. In the pumping phenomenon pressure pulsation moves the operating point of the supercharger repeatedly over to the surging area. In certain types of engines valves operate in groups, causing strong pulsation in the air chamber, impeding the operation of the supercharger and so adversely affecting the operation of the engine.

Moreover, the pulsation of pressure in the air chamber has an adverse effect on the filling of the cylinders. That is because the pressure level in the vicinity of each inlet valve fluctuates, and the amount of air remaining in the cylinder is ruled by the local pressure level when the inlet valve closes. The local pressure level may vary considerably, specifically in supercharged engines.

It is found that specifically in supercharged engines applying the so called Miller-process, the valve timing, specifically when closing the inlet valve in the cycle prior to bottom dead center, and also on simultaneous opening of valves, aggravates the above mentioned pumping phenomena.

It is an aim of the present invention to provide an arrangement for feeding air into a piston engine and a method of operating a supercharged piston engine, with which it is possible to advance the known art and minimize the above and preferably other shortcomings of the prior art. It is a specific intention of the invention to provide an arrangement suitable for feeding air into a piston engine applying the so-called Miller-process and a method of operating such a piston engine.

SUMMARY OF THE INVENTION

The present invention provides an arrangement for feeding air in a supercharged piston engine and a method of operating a supercharged piston engine.

The arrangement for feeding air in a supercharged piston engine according to the invention comprises at least a supercharging device arranged for feeding air to more than one cylinder, an air chamber in connection with the supercharging device, and a channel arrangement leading from the air chamber to each cylinder of the piston engine. According to the invention a resonator system is arranged in connection with the air chamber for attenuating pressure pulsation in the air chamber. Advantageously the resonator system is arranged mainly to attenuate pressure pulsation, which appear at the third harmonics of the rotational speed of the engine or frequencies below that. The resonator system may be formed by use of a resonator chamber, which opens into the air chamber of the engine.

Preferably the supercharging device is connected to a first end of the air chamber and the resonator system is arranged to operate substantially on the opposite end, i.e. a second end, to the first end of the air chamber. This way the effect of the resonator system according to the invention is optimal.

According to an embodiment of the invention the resonator system may be formed of one or several elements each defining an elongated space, which are arranged to open into the air chamber. The air chamber is arranged to have a certain cross-sectional area perpendicular to a direction of successive cylinders, which in this connection means an average area. The average cross sectional area may be obtained by dividing the total volume of the air chamber by its total length. It is noticed that, in practice, it is advantageous as a whole that the cross sectional area of the space of the resonator system is below 50%, but advantageously below about 30%, of the cross-sectional area of the air chamber.

The resonator system provides advantages relating to its construction and production if it is arranged in connection with constructions of an engine block and/or an air chamber.

The resonator system may also comprise a mechanical oscillator as well as an actuator system for moving the oscillator.

In the method according to the invention in connection with a supercharged piston engine, combustion air is fed by means of a supercharging device to a pressure higher than ambient pressure into an air chamber in connection with the supercharging device, and air is led from the air chamber to cylinders in connection with the air chamber through channel arrangements between the cylinders and the air chamber. A pressure pulsation is generated in the air chamber, which pulsation is half-wavelength shifted from a pulsation in the air chamber at the third harmonics of the rotational speed of the engine or at frequencies below that. Advantageously but not necessarily, the pressure pulsation is formed mainly at the opposite end to the coupling location of the supercharging device in the air chamber.

The resonator system may be controlled to be adjusting according to the rotational speed of the engine. If so, at each respective speed, the resonator system is controlled to attenuate substantially that pressure pulsation which appears at the third harmonics of the rotational speed of the engine or frequencies below that, so it always operates optimally.

Advantageously the engine is arranged to be operated according to the so-called Miller-process and the supercharging device operates using the energy of exhaust gases of the engine.

BRIEF DESCRIPTION OF THE DRAWINGS

The invention will be further described, by way of example only, with reference to the accompanying drawings, in which FIG. 3 shows schematically an third embodiment of a supercharged piston engine according to the invention.

DETAILED DESCRIPTION

Figure 1:
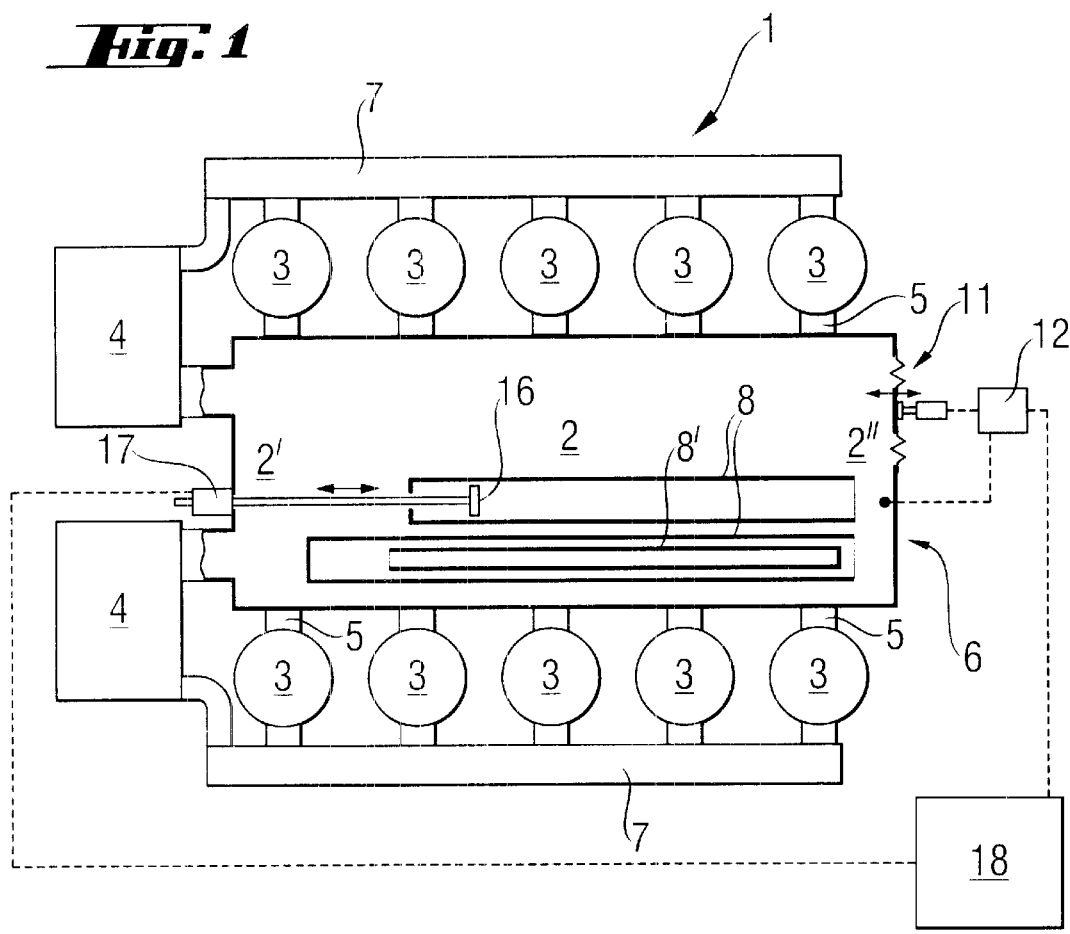
FIG. 1 shows schematically an embodiment of a supercharged piston engine according to the invention.

FIG. 1 shows a supercharged piston engine 1. The engine is a so-called V-engine having two rows of cylinders 3. The cylinders of each row are distributed along a line. For clarity, only components relevant for describing the invention have been shown in the figure. The engine includes at least supercharging devices 4, which have been arranged to feed air for the cylinders 3. The superchargers are connected to an air chamber 2, from which the air is led to each cylinder through a channel arrangement 5 including at least one channel or passage for each cylinder. Each supercharging device may include a supercharger, such as a turbocharger, and other devices, such as an intercooler, between the supercharger and the air chamber 2. For reasons of clarity, such other devices are not separately shown. The air chamber is elongated and extends in the direction of the cylinder line. The supercharging device 4 feeds air into the air chamber and the pressurized air is distributed therefrom to each cylinder 3. The length of the air chamber is such that air may be fed to each cylinder 3 through a rather short channel 5 leading from the air chamber to each cylinder. A resonator system 6 is arranged in connection with the air chamber 2 for attenuating pressure pulsation in the air chamber. With the arrangement according to the invention it is possible to ensure appropriate operation, particularly of turbo-charged engines, in all circumstances.

As can be seen from FIG. 1, the supercharging device 4 is connected to a first end 2' of the elongated air chamber 2. The resonator system 6 is provided in order to operate substantially on the opposite end 2" of the air chamber 2. The figure shows how the resonator system 6 is formed using one or several members having an elongated interior space, like tubes 8, 8', which members open into the air chamber. The air chamber forms a space which is directly in communication with the supercharging device 4. The space is arranged to have a certain cross-sectional area perpendicular to a line of successive cylinders, which in this connection means average cross-sectional area. The average cross-sectional area of the space may be defined by dividing the total volume of the air chamber by its total length.

Theoretically, with a view to attenuating pulsation, it would be optimal if the vibrating air mass of the resonator system 6 corresponded to the air mass in the air chamber 2. That would result in an arrangement in which the space of the resonator system would have a cross sectional area 50% of the cross sectional area of the air chamber. However, in practice it has been discovered that it is advantageous in respect of operation as a whole, if the cross-sectional area of the resonator system is about 30% of the cross-sectional area of the air chamber. In this way, an adequate attenuation is accomplished without substantially impairing the flow of combustion air for the engine.

An engine arrangement dimensioned in accordance with these principles operates so that combustion air for the engine is fed by means of a supercharging device 4 into the air chamber 2 at a pressure higher than ambient air pressure. From the air chamber 2 the air is led to cylinders 3 in connection with the air chamber through channel arrangements 5 connecting each cylinder with the air chamber. A disturbing pressure pulsation may be formed in the air chamber by a particular pattern or sequence of operation of the inlet valves. The disturbing pulsation may have a frequency at or below the third harmonic of the rotational speed of the engine. For example, for an engine rotating mainly at a speed of 1500 revolutions per minute (rpm), the disturbing pulsation may have a frequency of about 75 Hz. By proper tuning of the resonator system 6, a pressure pulsation is formed in the air chamber, which pulsation is half-wavelength shifted in phase from the disturbing pulsation in the air chamber and absorbs energy of the disturbing pulsation in the region of the tuning frequency.

In the engine according to FIG. 1, the compensating pressure pulsation is realized mainly at the opposite end 2" to the coupling location of the supercharger to the air chamber. The dimensioning of such a resonator tube 8 takes place simplistically using the equation $$f = \frac{C}{4L}$$

in which f stands for the tuning frequency, C for speed of sound in the medium in question and L for the operational length of the resonator.

In practice, the tuning frequency may be in the range from about 37.5–75 Hz (i.e. from the 1.5th–3rd harmonic), but the resonator attenuates pulsation above and below the tuning frequency.

This kind of resonator tube 8, 8' may be realized also by providing several tubes within each other. In that case, each tube being closed at one end, an inner tube 8' is fitted inside the outer tube 8, so that its open end faces the closed end of the outer tube 8. In this manner it is possible to provide a system having shorter external dimensions while the operational length remains substantially the same.

With this method is possible to achieve a considerable effect, specifically on a pulsation which affects the operation of a supercharger, especially a turbocharger. In FIG. 1 the supercharger is connected to an exhaust gas channel 7 and it is operated by the energy of exhaust gases. The arrangement according to the invention is specifically advantageous for an engine or in connection with a method, which is arranged to operate so that the inlet valves of the engine are closed before the bottom dead center position of the piston during the operating cycle of the engine.

In FIG. 1 there is shown also an embodiment of the invention in which the resonator system 6 operates as an active resonator system or in which its operation is controllable. A mechanical oscillator such as a movable membrane 11 or the like is provided in connection with the air chamber 2 and an actuator system 12 is provided for moving the membrane. In this kind of solution the phase of the pulsation of the resonator system is shifted in phase by one half-wavelength from the disturbing pulsation in the air chamber. This may be accomplished, for example, by means of a control unit controlling the movement of the actuator system 12 based on measurement of the pressure pulsation in the air chamber. The actuator system is in this case also connected to a separate engine control system 18, which may feed control information to the actuator system. This kind of resonator system may be arranged to be controlled to correspond the operating conditions of the engine. The resonator system may for example be adjusted according to the rotational speed of the engine so that at each speed the resonator system is controlled to attenuate substantially the pressure pulsation which appears at or below the third harmonic of the rotational speed of the engine.

FIG. 1 also shows another way of implementing an active resonator system 6, the operation of which may be actively controlled. A piston device 16 is at the other end of the tube 8, and an actuator 17 is arranged to move the piston device as shown by the arrow such that the operational length of the tube 8 is alterable. The actuator is further connected to the control system 18, which transmits control information to the actuator as mentioned before.

Figure 2:
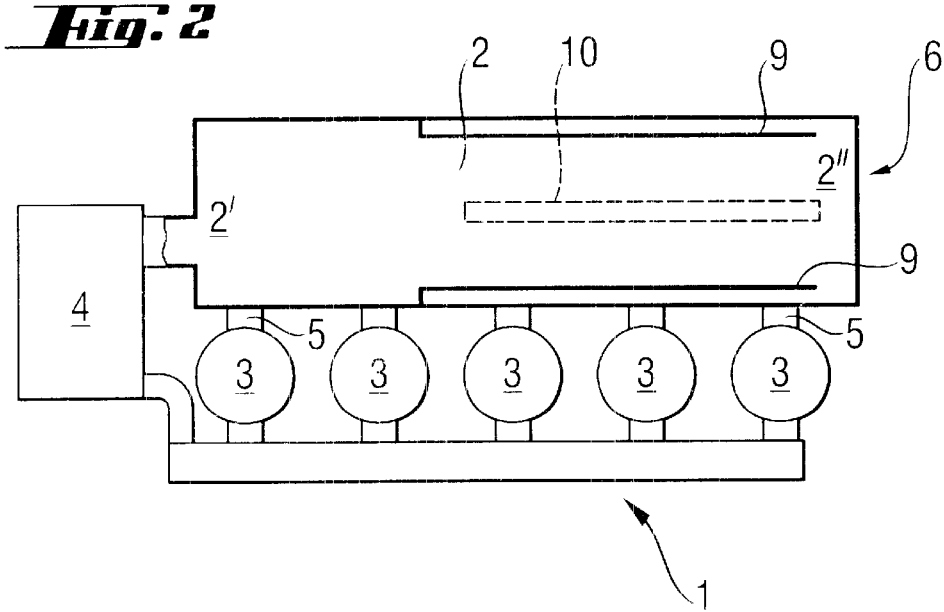
FIG. 2 shows schematically another embodiment of a supercharged piston engine according to the invention.

FIG. 2 shows schematically another embodiment of supercharged piston engine according to the invention and in this figure, the reference numerals correspond to those of FIG. 1. The engine in FIG. 2 is an in-line engine and its operation, with respect of the invention, corresponds to the engine of FIG. 1. FIG. 2 shows how the resonators of the resonator system 6 have been constructed as a part of the engine structure. The elongated space of the resonator system is at least partly formed in a wall 9 of the air chamber 2. For this purpose it is possible to use advantageously also the wall of the engine block 10, and the resonators may be constructed already at the casting stage of the engine block. Thus, below the air chamber in FIG. 2, there is the engine block, which is illustrated by the dashed line but is not otherwise shown for reasons of clarity. With this procedure it is possible to provide significant advantages, inter alia firmness or rigidity of construction and saving of space.

FIG. 3 shows schematically a third embodiment of a supercharged piston engine according to the invention and in the figure, the reference numbers correspond to those of FIG. 1. With respect to the invention, the operation of the engine of FIG. 3 corresponds that of FIG. 1. In FIG. 3, a resonator of the resonator system 6 is formed as a part of the structure of the engine. A partition wall 13 or the like is arranged inside the chamber 2 and separates a chamber 15 from the air chamber. The partition wall 13 is advantageously arranged so that the cross-sectional area of the air chamber decreases towards its second end 2". In this example, the wall 13 begins approximately half way along the chamber 2. There is an elongated opening 14 provided in the partition wall, which opening may be formed as a pipe. The elongated opening connects the chamber 15 and the air chamber with each other. With this solution it is possible to provide both a favorable form of the air chamber in respect of flow, and also a pulsation attenuating resonator system located in connection with the air chamber, whereas no external additional space is required. This resonator system operates in the manner of a so-called Helmholtz-resonator: its tuning approximately complies with the equation $$f = \frac{C}{2\pi}\sqrt{\frac{S}{LV}}$$

in which f stands for the tuning frequency, C for the speed of sound in the medium in question, S for the diameter of opening 14, L for the length of opening 14 and V for the volume of chamber 15.

Several embodiments have been described above and it is possible to apply them separately or combine them according to need in particular circumstances.

Thus, it is clear that the technical solutions disclosed above are only exemplary, and the invention is not limited to the embodiment shown but several modifications of the invention are reasonable within the scope of the attached claims.

What is claimed is:

1. A multi-cylinder internal combustion engine comprising:
    a supercharger for providing air under pressure,
    a means defining an air chanter connected to the supercharger for receiving air from the supercharger,
    passages leading from the air chamber to at least two cylinders, and
    a resonator system in fluid communication with the air chamber for attenuating pressure pulsations in the air chamber,
    and wherein the resonator system is adapted to attenuate principally pressure pulsations at frequencies at and below the third harmonic of the rotational a speed of the engine.

2. An engine according to claim 1, wherein the air chamber has first and second opposite ends, the supercharger is connected to the first end of the air chamber and the resonator system operates essentially at the second end of the air chamber.

3. An engine according to claim 1, wherein the resonator system comprises at least one elongated element having an interior space that communicates with the air chamber.

4. An engine according to claim 3, wherein the engine has multiple cylinders distributed along a line and the cross-sectional area of the interior space of the resonator system is less than 50% of the cross-sectional area of the air chamber.

5. An engine according to claim 4, wherein the cross-sectional area of the interior space of the resonator system is less than 30% of the cross-sectional area of the air chamber.

6. An engine according to claim 1, wherein the resonator system is formed of a resonator chamber having an interior space in communication with the air chamber.

7. An engine according to claim 1, wherein the resonator system comprises a mechanical oscillator and an actuator for moving the oscillator.

8. An engine according to claim 7, wherein the mechanical oscillator comprises a moveable membrane.

9. An engine according to claim 1, wherein the engine has an engine block and the resonator system is connected to the engine block.

10. An engine according to claim 1, wherein the resonator system is part of the means defining the air chamber.

11. An engine according to claim 1, wherein the resonator system is externally controllable.

12. A method of operating a multi-cylinder internal combustion engine that comprises a supercharger for providing air under pressure, a means defining an air chamber connected to the supercharger for receiving air from the supercharger, and passages leading from the air chamber to at least two cylinders, said method comprising:
    forming a pressure pulsation in a resonator space that is in fluid communication with the air chamber, the pressure pulsation being shifted by a half wavelength with respect to a pressure pulsation in the air chamber at a frequency at or below the third harmonic of the rotational speed of the engine.

13. A method according to claim 12, comprising operating the engine according to the Miller process and employing energy of the exhaust gases of the engine to operate the supercharger.

14. A method according to claim 12, wherein the air chamber has first and second opposite ends, the supercharger is connected to the air chamber at the first end thereof and the method comprises forming the pressure pulsation principally at the second end of the air chamber.

15. A method according to claim 12, comprising controlling the resonator system according to the rotational speed of the engine.

16. A method of operating a rotational multi-cylinder internal combustion engine that comprises a supercharger for providing air under pressure, a means defining an air chamber connected to the supercharger for receiving air from the supercharger, and passages leading from the air chamber to at least two cylinders, said method comprising:

employing the supercharger to feed air at a pressure higher than ambient atmospheric pressure into the air chamber, forming a pressure pulsation in the air chamber, the pressure pulsation being shifted by a half wavelength with respect to a pressure pulsation in the air chamber at a frequency at or below the third harmonic of the rotational speed of the engine.

17. A method according to claim 16, comprising operating the engine according to the Miller process and employing energy of the exhaust gases of the engine to operate the supercharger.

18. A method according to claim 16, wherein the air chamber has first and second opposite ends, the supercharger is connected to the air chamber at the first end thereof and the method comprises forming the pressure pulsation principally at the second end of the air chamber.

19. A method according to claim 16, comprising controlling the resonator system according to the rotational speed of the engine.

20. A multi-cylinder internal combustion engine comprising:

a supercharger for providing air under pressure, a means defining an air chamber connected to the supercharger for receiving air from the supercharger, passages leading from the air chanter to at least two cylinders, and a resonator system in fluid communication with the air chamber for attenuating pressure pulsations in the air chamber, the resonator system comprising at least one elongated element having an interior space that communicates with the air chamber, and wherein the engine has multiple cylinders distributed along a line and the cross-sectional area of the interior space of the resonator system is less than 50% of the cross-sectional area of the air chamber.

21. An engine according to claim 20, wherein the air chamber has first and second opposite ends, the supercharger is connected to the first end of the air chamber and the resonator system operates essentially at the second end of the air chamber.

22. An engine according to claim 20, wherein the resonator system comprises at least one elongated element having an interior space that communicates with the air chamber.

23. An engine according to claim 20, wherein the cross-sectional area of the interior space of the resonator system is less than 30% of the cross-sectional area of the air chamber.

24. An engine according to claim 20, wherein the resonator system is formed of a resonator chamber having an interior space in communication with the air chamber.

25. An engine according to claim 20, wherein the resonator system comprises a mechanical oscillator and an actuator for moving the oscillator.

26. An engine according to claim 25, wherein the mechanical oscillator comprises a moveable membrane.

27. An engine according to claim 20, wherein the engine has an engine block and the resonator system is connected to the engine block.

28. An engine according to claim 20, wherein the resonator system is part of the means defining the air chamber.

29. An engine according to claim 20, wherein the resonator system is externally controllable.

\* \* \* \* \*

UNITED STATES PATENT AND TRADEMARK OFFICE
CERTIFICATE OF CORRECTION

PATENT NO.   : 6,622,486 B2
DATED        : September 23, 2003
INVENTOR(S)  : Arto Järvi It is certified that error appears in the above-identified patent and that said Letters Patent is hereby corrected as shown below:

Column 6,
Line 10, the word "chanter" should be deleted and replaced with -- chamber --.

Signed and Sealed this

Twenty-eighth Day of October, 2003

JAMES E. ROGAN
*Director of the United States Patent and Trademark Office*